United States Patent [19]
Hathaway et al.

[11] Patent Number: 6,105,128
[45] Date of Patent: Aug. 15, 2000

[54] METHOD AND APPARATUS FOR DISPATCHING INSTRUCTIONS TO EXECUTION UNITS IN WAVES

[75] Inventors: Robert G. Hathaway, Santa Clara; Ramesh Kumar Panwar, Sunnyvale, both of Calif.

[73] Assignee: Intel Corporation, Santa Clara, Calif.

[21] Appl. No.: 09/070,076

[22] Filed: Apr. 30, 1998

[51] Int. Cl.[7] .................................................. G06F 15/00
[52] U.S. Cl. .......................................................... 712/215
[58] Field of Search ........................... 712/215, 23, 205, 712/216, 220

[56] References Cited

U.S. PATENT DOCUMENTS

5,815,724   9/1998   Mates ......................................... 712/242
5,913,049   6/1999   Shiell et al. ............................. 712/215

Primary Examiner—David Y. Eng
Attorney, Agent, or Firm—Blakely, Sokoloff, Taylor & Zafman, LLP

[57] ABSTRACT

A first embodiment provides an apparatus including a first execution unit capable of executing a first type and a second type of ready instruction, a second execution unit capable of executing the second type of ready instruction, and a scheduler. The scheduler dispatches the instructions in waves and dispatches the first type of ready instruction to the first execution unit with a higher priority than the second type of ready instruction. The scheduler is capable of dispatching a second type of ready instruction to the second execution unit. A second embodiment provides a method of dispatching instructions in a processor having a scheduler, a first execution unit, and a second execution unit is provided. The method includes dispatching a first type of ready instruction to the first execution unit with a higher priority than dispatching a second type of ready instruction to the first execution unit in each wave. The method includes dispatching the second type of instruction to the second execution unit, the two steps of dispatching being performed in a wave.

26 Claims, 8 Drawing Sheets

METHOD AND APPARATUS FOR DISPATCHING INSTRUCTIONS TO EXECUTION UNITS IN WAVES

BACKGROUND OF THE INVENTION

1. Field of the Invention

The present invention relates generally to computer hardware, and more specifically, to a method and apparatus for dispatching instructions to execution units in waves.

2. Description of the Related Art

Modern processors frequently use techniques that execute instructions in parallel, because parallel execution techniques increase the effective operating speed of the processor. Parallel execution can be implemented in processors that dispatch instructions for execution in an order that does not necessarily reflect the original instruction order, i.e., in out-of-order processors. An out-of-order processor implements a parallel execution scheme by dispatching two or more instructions to the execution units in a wave, ordinarily being dispatched in the same clock cycle.

Figure 1:
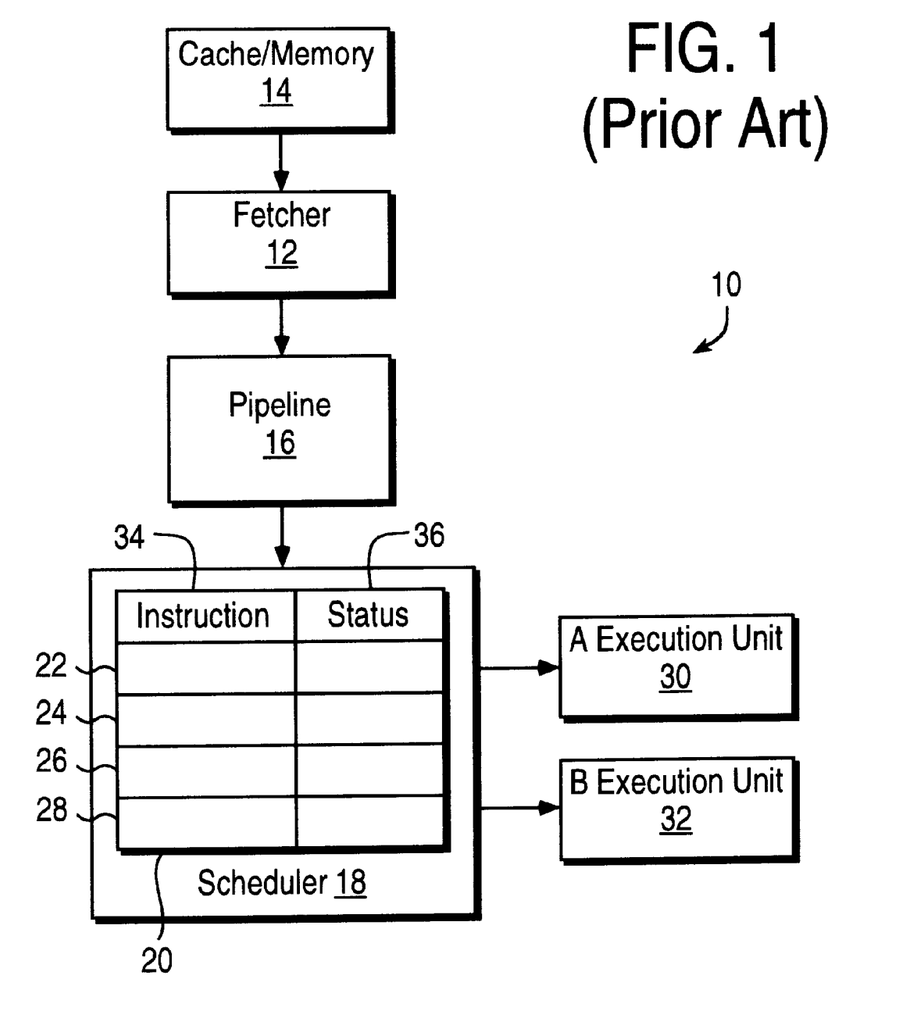
FIG. 1 is a high-level diagram illustrating a portion of a processor of the prior art.

FIG. 1 illustrates a portion of an out-of-order processor 10. The processor 10 includes a fetcher 12 for retrieving instructions from an instruction cache or memory 14. The fetcher 12 sends the instructions down a pipeline segment 16 that may include hardware devices such as decoders and/or renamers (both not shown). The pipeline segment 16 sends executable instructions to a scheduler 18. The scheduler 18 accepts an instruction from the pipeline segment 16, when a position 22, 24, 26, 28 becomes available in an internal instruction buffer 20. The scheduler 18 dispatches instructions from the instruction buffer 20 to the execution units 30, 32 in an order that may be different from the original instruction order.

The scheduler 18 dispatches an instruction for execution when the resources necessary to execute the instruction become available. The resources for execution may include the data for source operands of the instruction and one of the execution units 30, 32 that is capable of executing the instruction. Each position 22, 24, 26, 28 of the instruction buffer 20 has two spaces 34, 36. The first space 34 stores the machine word for the instruction, i.e., the binary word encoding the instruction and operands. The second space 36 stores the status of the instruction, i.e., "ready" or "not ready." The status has the "ready" value when all of the needed resources for execution are available. The scheduler 18 only dispatches "ready" instructions to the execution units 30, 32.

Referring to FIG. 1, the instruction set of the processor 10 contains instructions of types A, B, and X. The execution units 30, 32 are of types A and B. The "A" execution unit 30 is able to execute the instructions of types A and X. The "B" execution unit 32 is able to execute the instructions of types B and X. Thus, the type X instructions can be executed by either of the execution units 30, 32, but the instructions of types A and B can only be executed by one of the two execution units 30, 32.

Figure 2:
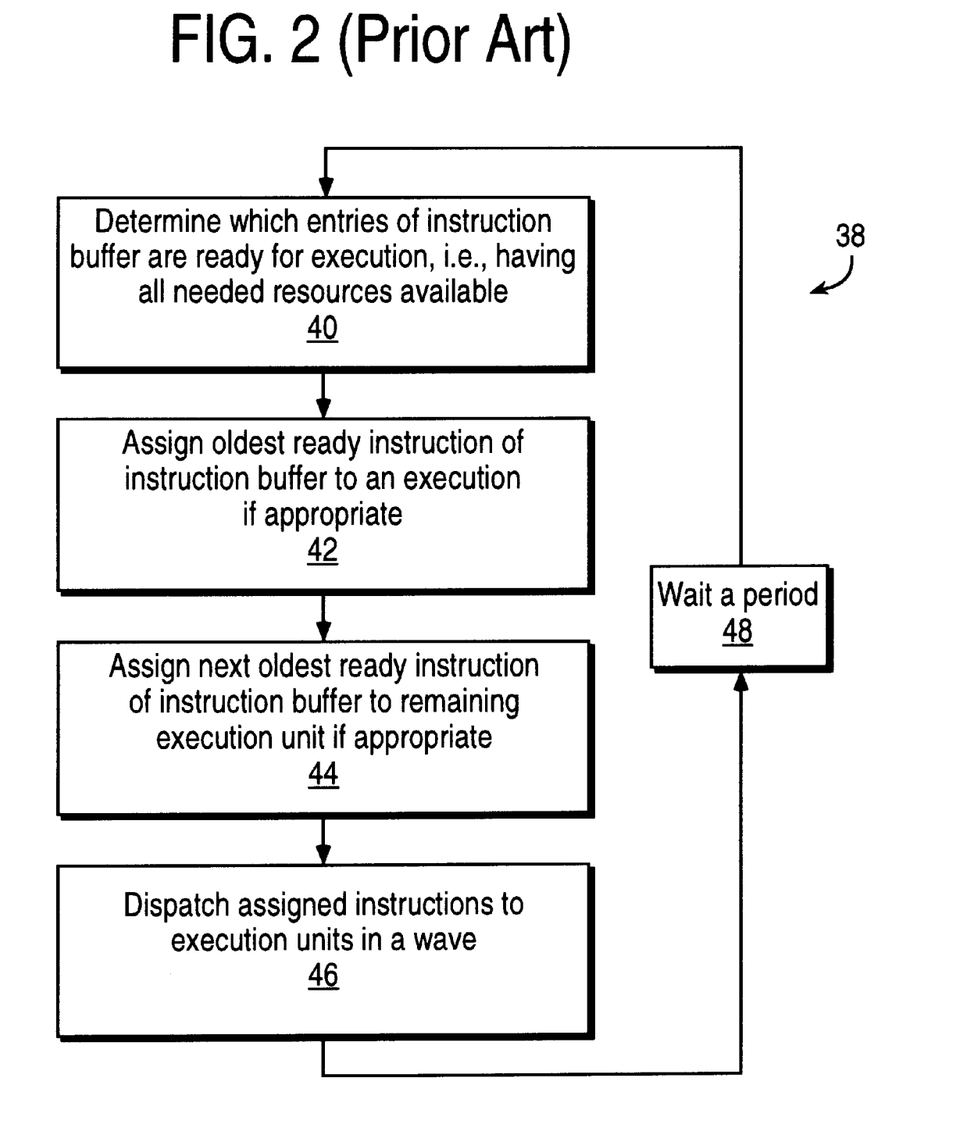
FIG. 2 is a flowchart illustrating the steps of a prior art method for the wave dispatch of instructions for execution in the processor of FIG. 1.

FIG. 2 is a flowchart illustrating a pseudo-first-in-first-out ("pseudo-FIFO") method 38 for assigning instructions to be dispatched in waves in the processor 10 of FIG. 1. At block 40, the scheduler 18 determines which entries of the instruction buffer 20 correspond to instructions "ready" for execution. The scheduler 18 determines which instructions are "ready" by reading the status spaces 36 of the positions 22, 24, 26, 28. At blocks 42 and 44, scheduler 18 employs an algorithm for assigning "ready" instructions for execution.

At block 42, the scheduler 18 assigns the oldest "ready" instruction to one of the execution units 30, 32 if available and appropriate. At block 44, the scheduler 18 attempts to assign the second oldest "ready" instruction to one of the execution units 30, 32 that is available and appropriate if no execution unit is appropriate for the oldest "ready" instruction. If the remaining execution unit 30, 32 is not appropriate for executing the next oldest ready instruction, the scheduler 18 attempts to assign the next to next oldest ready instruction to the remaining execution units 30, 32, etc. (not shown). At block 46 the scheduler 18 dispatches the assigned instructions to the "A" and "B" execution units 30, 32, in a wave. Wave dispatching ordinarily dispatches the assigned instructions for execution in the same clock cycle. At block 48, the scheduler 18 waits a predetermined time before re-executing the sequence of steps of the method 38.

Referring to FIGS. 1 and 2, though the pseudo-FIFO assignment algorithm may reduce the probability that individual instructions will stagnate in the instruction buffer 20, the algorithm does not make full use of the execution units 30, 32. To see this, one considers a specific form of the method 38 that assigns types A and B instructions to the "A" and "B" execution units 30, 32 respectively. The specific form of the method 38 assigns a type X instruction to the "A" execution unit 30 if available and, if not, a type X instruction is assigned to the "B" execution unit 32 if available. Then, if a type X instruction is the oldest ready instruction, the type X instruction has priority to be assigned to the "A" execution unit 30. If the next oldest ready instruction is of type A, the type A instruction cannot be assigned to the remaining execution unit 32, because the "B" execution unit 32 cannot execute type A instructions. Thus, the "B" execution unit 32 remains idle and an opportunity to dispatch both the type X and A instructions in the same dispatch wave is lost. If the algorithm is changed so that a type X instruction is assigned to the "B" execution unit 32 if available and, if not, the type X instruction is assigned to the "A" execution unit 30 similar inefficiencies arise. The pseudo-FIFO assignment algorithm results in lost opportunities to execute ready instructions and slows the parallel processing of instructions that are dispatched in waves.

The present invention is directed to overcoming, or at least reducing the effects of, one or more of the problems set forth above.

SUMMARY OF THE INVENTION

In a first aspect of the present invention, an apparatus is provided. The apparatus includes a first execution unit capable of executing a first type and a second type of ready instruction, a second execution unit capable of executing the second type of ready instruction, and a scheduler. The scheduler dispatches the instructions in waves and dispatches the first type of ready instruction to the first execution unit with a higher priority than the second type of ready instruction. The scheduler is capable of dispatching a second type of ready instruction to the second execution unit.

In a second aspect of the present invention, a method of dispatching instructions in a processor having a scheduler, a first execution unit, and a second execution unit is provided. The method includes dispatching a first type of ready instruction to the first execution unit with a higher priority than dispatching a second type of ready instruction to the first execution unit in each wave. The method includes dispatching the second type of instruction to the second execution unit, the two steps of dispatching being performed in a wave.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 3:
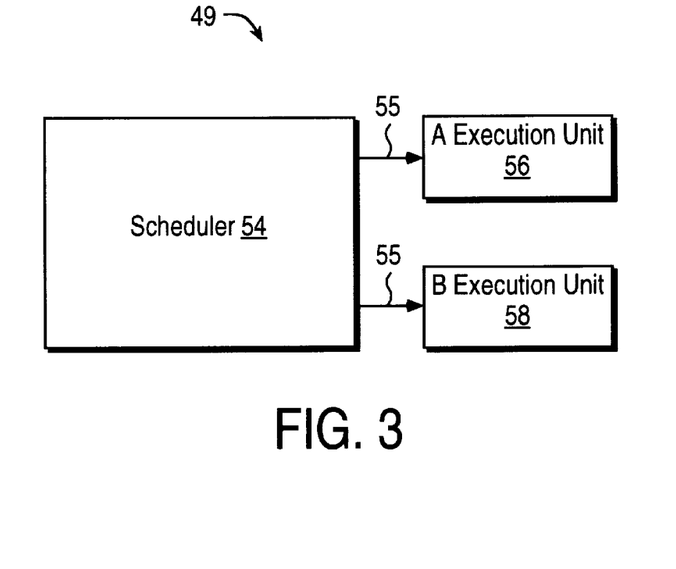
FIG. 3 is a high-level diagram illustrating a portion of one embodiment of a processor that dispatches instructions for execution in waves.

FIG. 3 illustrates a portion of a processor 49 that is adapted to dispatch instructions in waves, ie., to dispatch a plurality of instructions to execution units 56, 58 in one clock cycle. The processor 49 includes an instruction scheduler 54 and the "A" and "B" execution units 56, 58. Lines 55 connect outputs of the instruction scheduler 54 to the "A" and "B" execution units 56, 58. The "A" execution unit 56 can execute ready type A and X instructions. The "B" execution unit 58 can execute ready type X instructions and cannot execute ready type A instructions. The instruction scheduler 54 assigns instructions to the execution units 56, 58 in waves according to a priority scheme that depends on the types of the ready instructions as set forth below. Some waves may contain more than one instruction.

Figure 4:
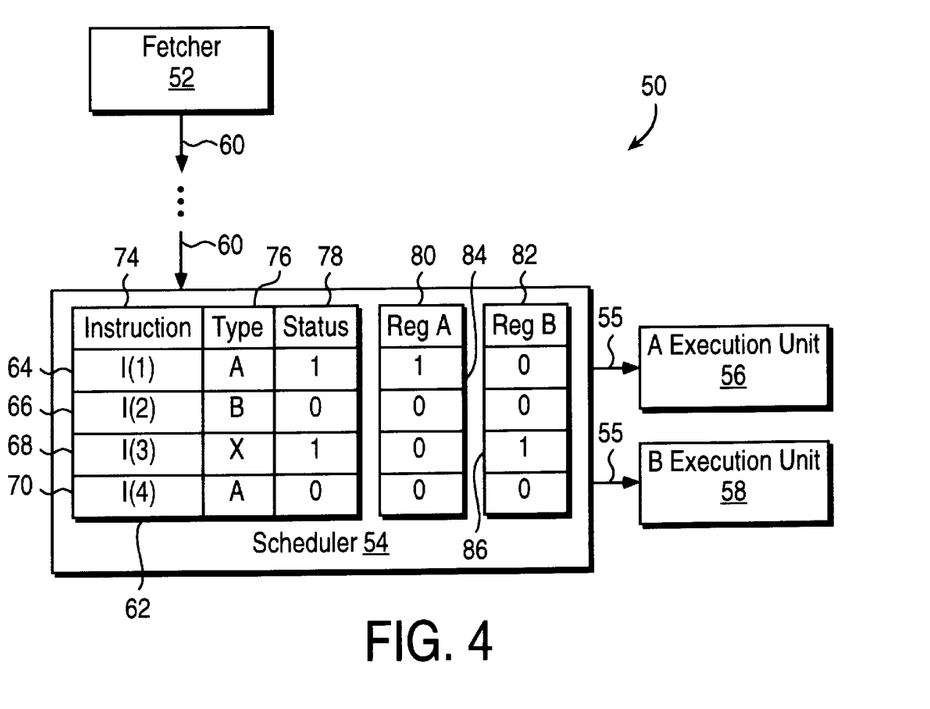
FIG. 4 is a specific embodiment of the processor of FIG. 3.

FIG. 4 shows a portion of a processor 50 that is a specific embodiment of the processor 49 illustrated in FIG. 3. A fetcher 52 retrieves from memory (not shown) a sequence of instructions to be executed. The fetcher 52 sends the retrieved instructions to a line 60. In some embodiments, the line 60 may include hardware structures such as decoders, a renamer, branch prediction logic, etc. (all not shown) depending on the particular implementation. The scheduler 54 receives instructions from the line 60 as space becomes available in an internal instruction buffer 62. Instructions leaving the line 60 are executable by the "A" and "B" execution units 56, 58.

The scheduler 54 includes an instruction buffer 62 having a plurality of positions 64, 66, 68, 70 for storing instructions. Each position 64, 66, 68, 70 includes a space 74 to store the machine code word for the instruction, a space 76 to store the type of the instruction, and a space 78 to store the "ready" status of the instruction. The scheduler 54 assigns instructions to dispatch waves, which may contain more than one instruction, according to a priority scheme that depends on the types of the ready instructions in the instruction buffer 62 as set forth below.

Referring to FIGS. 3 and 4, the processors 49, 50 execute restrictive and generic instructions. The type A instructions are restrictive instructions, i.e., instructions that can be executed by a subset of the execution units 56, 58. The type A instructions can be executed on the "A" execution unit 56 and cannot be executed on the "B" execution unit 58. The type X instructions are generic instructions, i.e., instructions that can be executed on more than one of the execution units 56, 58. The type X instructions can be executed on both the "A" and "B" execution units 56, 58. The processor 50 of FIG. 4 also has type B restrictive instructions that can be executed on the "B" execution unit 58 and cannot be executed on the "A" execution unit 56. In some embodiments, more types of restrictive and/or generic instructions may exist and different execution units (not shown) may also be capable of executing the above-mentioned instructions.

Specific embodiments may include several instruction types. For example, one embodiment includes integer arithmetic, floating-point arithmetic, memory access, and multi-media instruction types, which are each executable on different subsets of execution units. Furthermore, the above-mentioned types may include more restrictive instruction types. For example, an embodiment may have the two execution units 56, 58 of FIGS. 3 and 4 for integer arithmetic. Then, the integer arithmetic instructions may include generic integer arithmetic instructions executable on both of the units 56, 58, e.g., unsigned addition instructions, and specific arithmetic instructions, e.g., signed addition instructions, executable only on one of the arithmetic execution units. In particular embodiments the specific and generic instruction types may, of course, take different forms.

Referring to FIG. 4, the scheduler 54 includes, at least, two assignment registers 80, 82. The entries of the "A" assignment register 80 are for indicating which "ready" entry of the instruction buffer 62 is to be dispatched to the "A" execution unit 56. The entries of the "B" assignment register 82 are for indicating which "ready" entry of the instruction buffer 62 is to be dispatched to the "B" execution unit 58. In one embodiment, each assignment register 80, 82 has a memory cell corresponding to each position 64, 66, 68, 70 in the instruction buffer 62. In this embodiment, a logic value of 1 in one of the memory cells 84, 86 of one of the assignment registers 80, 82 indicates that the instruction of the corresponding position 64, 68 has been assigned to a dispatch wave. Thus, instruction I(1) is assigned to the "A"

execution unit 56, and instruction I(3) is assigned to the "B" execution unit 58 in the particular situation illustrated. At most, one instruction is assigned for execution on any one of the execution units 56, 58 in any single dispatch wave. The scheduler 54 uses the separate output lines 55 for dispatching the assigned instructions, e.g., I(1) and I(3), to the execution units 56, 58.

Still referring to FIG. 4, the scheduler 54 prioritizes the assignment of instructions in each dispatched wave based on whether the instructions belong to generic or restrictive types. Thus, for each dispatch wave, a type A instruction is assigned to the "A" execution unit 56 with a higher priority than a type X instruction, and a type B instruction is assigned to the "B" execution unit 58 with a higher priority than a type X instruction. In one embodiment of the priority scheme, the scheduler 54 first searches the instruction buffer 62 for ready type A and B instructions to assign to the "A" and the "B" execution units 56, 58, respectively. The scheduler 54 searches for ready type X instructions to assign in response to not finding enough ready type A and B instructions to fill all assignment positions. This scheme reduces the loss of opportunities occurring in the prior art of FIGS. 1–2, where a type X instruction was first assigned to one of the execution units 30, 32 and a ready type A or B instruction could not be assigned to the remaining execution unit 30, 32.

Figure 5:
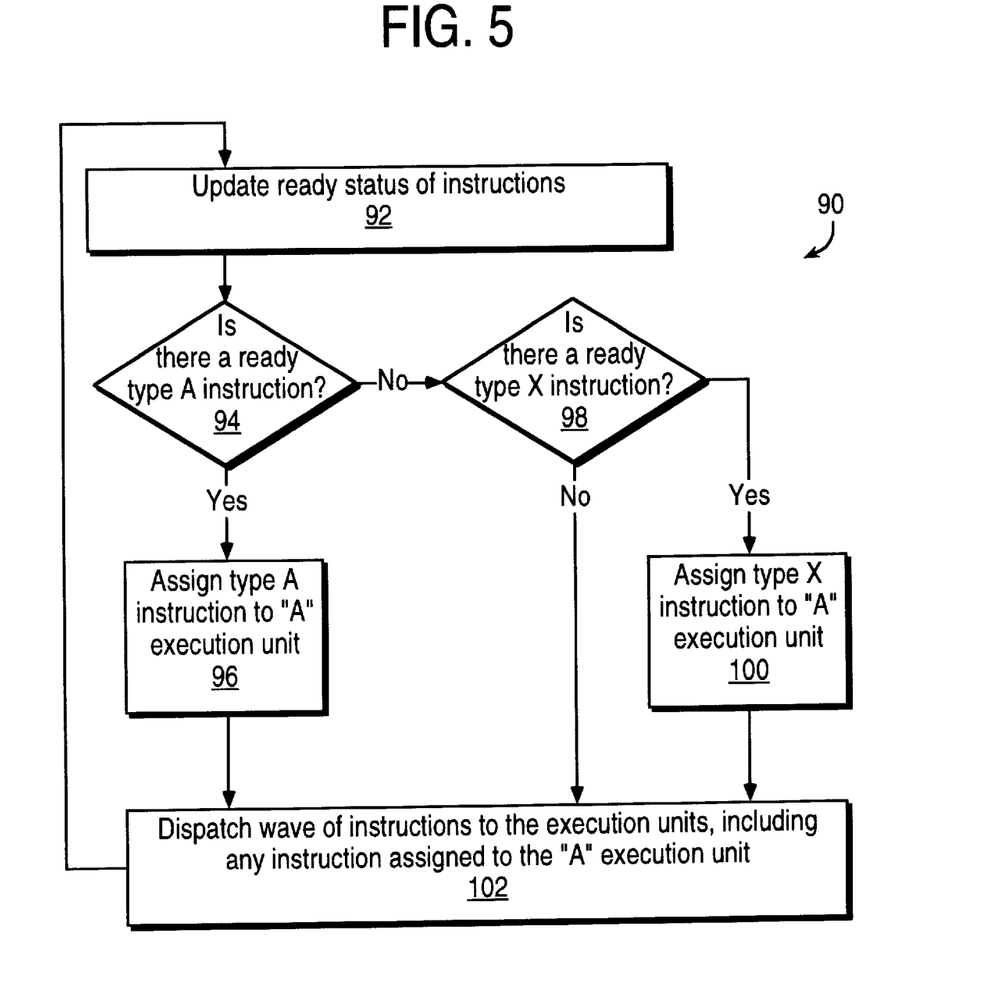
FIG. 5 is a flowchart illustrating a first embodiment for wave dispatching instructions in the processor of FIG. 3.

FIG. 5 is a flowchart illustrating one embodiment of a method 90 for wave dispatching of instructions in the processor 49 of FIG. 3. At block 92, the scheduler 54 updates the ready status of instructions awaiting execution. At block 94, the scheduler 54 searches for ready type A instructions. At block 96, the scheduler 54 assigns an instruction to the "A" execution unit 56 in response to finding a ready type A instruction. In the absence of finding a ready type A instruction at block 98, the scheduler 54 searches for a ready type X instruction. At block 100, the scheduler 54 assigns a type X instruction to the "A" execution unit 56 in response to finding a ready entry of type X. At block 102, scheduler 54 dispatches a wave of instructions for execution. The wave includes dispatching any instructions assigned to the "A" execution unit 56. After dispatching any assigned instructions at block 102, the method 90 repeats block 92.

Figure 6:
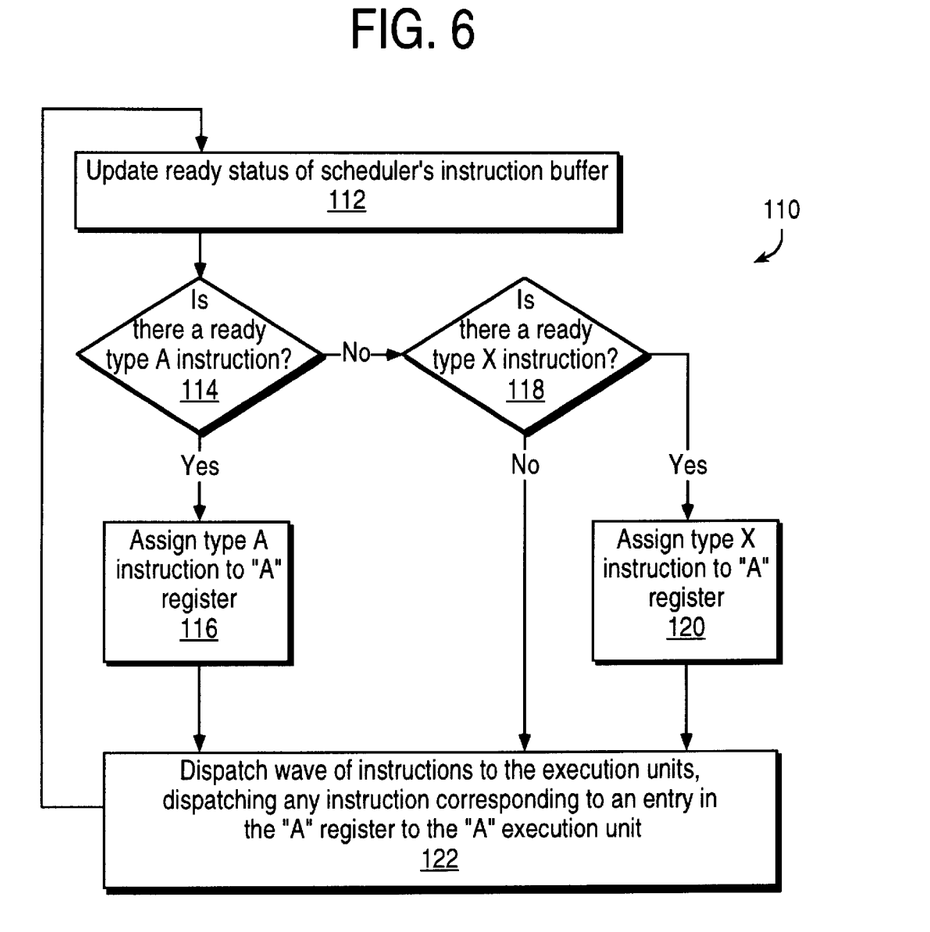
FIG. 6 is a flowchart illustrating a first embodiment for wave dispatching instructions in the processor of FIG. 4.

FIG. 6 is a flowchart illustrating a method 110 for wave dispatching instructions in the processor 50 of FIG. 4. At block 112, the scheduler 54 updates the spaces 78 in the instruction buffer 62 for the instruction's "ready" status. At block 114, the scheduler 54 searches the positions 64, 66, 68, 70 of the instruction buffer 62 for ready type A instructions. At block 116, the scheduler 54 assigns an instruction to the "A" assignment register 80 in response to finding a ready type A instruction. In the absence of a type A instruction at block 118, the scheduler 54 searches the positions 64, 66, 68, 70 of the instruction buffer 62 for a ready type X instruction. At block 120, the scheduler 54 assigns a type X instruction to the "A" assignment register 80 in response to finding a ready entry in the instruction buffer 62 of type X. At block 122, scheduler 54 dispatches a wave of instructions for execution. The wave dispatches any instructions assigned to the "A" assignment register 80, in blocks 116 or 120 for execution on the "A" execution unit 56. After dispatching any assigned instructions at block 122, the method 110 repeats block 112.

Figure 7:
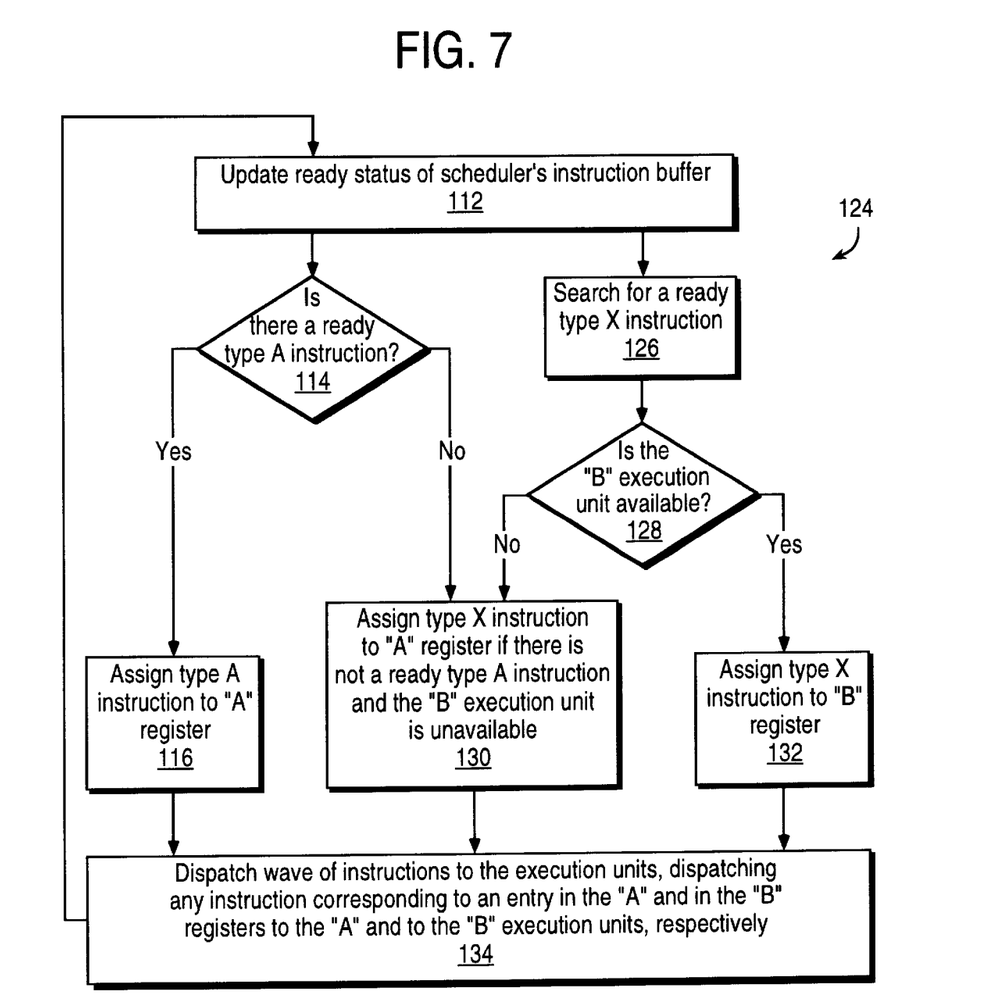
FIG. 7 is a flowchart illustrating a second embodiment for wave dispatching instructions in the processor of FIG. 4.

FIG. 7 is a flowchart illustrating another embodiment of method 124 for wave dispatching instructions on the processor 50 of FIG. 4. The steps of blocks 112, 114, and 116 have been described in connection with FIG. 6. At block 126, the scheduler 54 searches for a ready type X instruction in the instruction buffer 62 in parallel with the search for a ready type A instruction at block 114. At block 128, the scheduler 54 determines whether the "B" execution unit 58 is available to execute new instructions in response to finding a ready type X instruction at block 126. At block 130, the scheduler 54 assigns a type X instruction to the "A" assignment register 80 in response to finding that a type X instruction is ready at block 126, that the "B" execution unit 58 is unavailable at block 126, and that no type A instruction is ready at block 114. At block 132, the scheduler 54 assigns a type X instruction to the "B" assignment register 82 in response to finding that a type X instruction is ready at block 126 and that the "B" execution unit 58 is available at block 128. At block 134, scheduler 54 dispatches a wave of assigned instructions to the execution units 56, 58. Instructions corresponding to entries in the "A" and "B" assignment registers 80, 82 are dispatched to the "A" and "B" execution units 56, 58, respectively. After performing block 134, the step of block 112 repeats.

Figure 8:
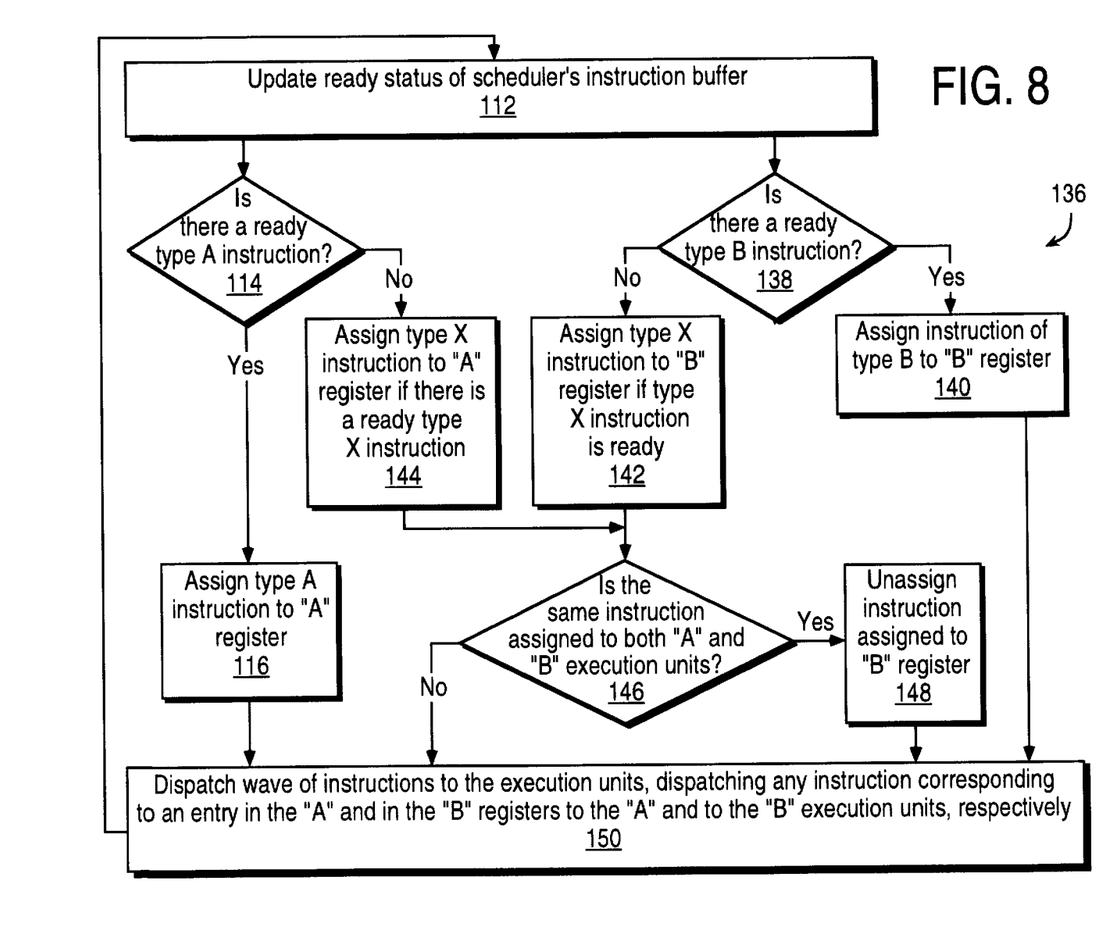
FIG. 8 is a flowchart illustrating a third embodiment for wave dispatching instructions in the processor of FIG. 4.

FIG. 8 is a flowchart illustrating another method 136 for a wave dispatching instructions in the processor 50 of FIG. 4. The steps of blocks 112, 114, and 116 have already been described in FIG. 6. At block 138, the scheduler 54 searches the positions 64, 66, 68, 70 of the instruction buffer 62 for a ready type B instruction in parallel with the search for a ready type A instruction at block 114. At block 140, the scheduler 54 assigns a type B instruction to the "B" assignment register 82 in response to having found a ready type B instruction. At block 142, the scheduler 54 assigns a type X instruction to the "B" register 82 if there is a ready type X instruction and a ready type B instruction is not found at block 138. At block 144, the scheduler 54 assigns a type X instruction to the "A" assignment register 82 if there is a ready type X instruction. At block 146, the scheduler 54 determines whether the instructions assigned to the "A" and "B" assignment registers 80, 82 are the same instruction if type X instructions are assigned to both the "A" and the "B" assignment registers 80, 82. At block 148, the scheduler 54 unassigns the type X instruction previously assigned to the "B" assignment register 82 in response to determining that the same instruction is also assigned to the "A" assignment register 80 at block 146. At block 150, the scheduler 54 dispatches instructions corresponding to entries in the "A" and the "B" assignment registers 80, 82 to the "A" and to the "B" execution units 56, 58, respectively. After performing block 150, the scheduler repeats block 112.

Figure 9:
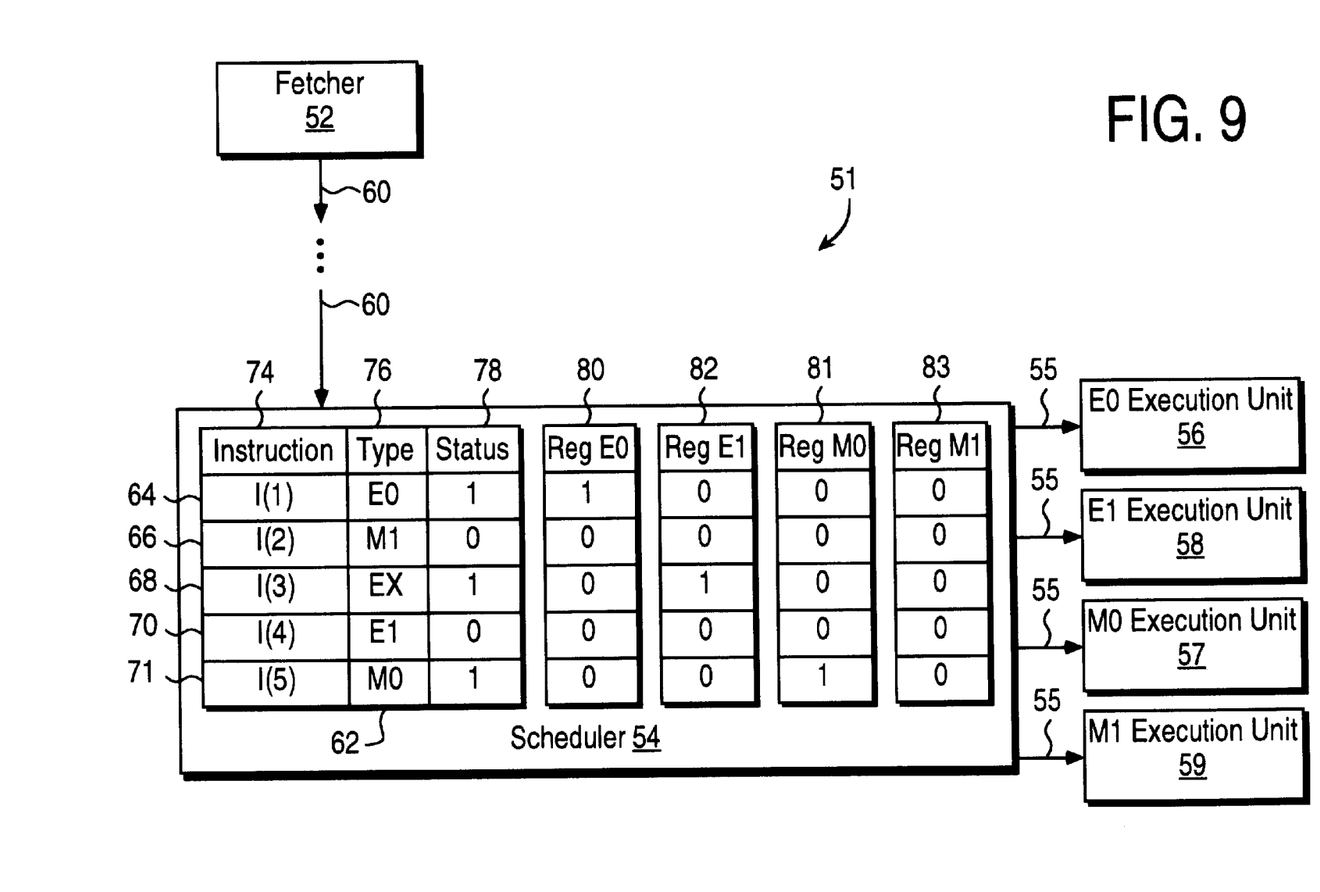
FIG. 9 is a high-level diagram illustrating another embodiment of processor of FIG. 4.

FIG. 9 illustrates a processor 51 that executes at least six instruction types, i.e., type E0, E1, EX, M0, M1, and MX instructions. For example, the instructions E0, E1, and EX are integer arithmetic instructions, and the instructions M0, M1, and MX are memory load/store instructions in one embodiment. The type E0 instructions can only be executed on the "E0" execution unit 56. The type E1 instructions can only be executed on the "E1" execution unit 58. Type M0 instructions can only be executed on the "M0" execution unit 57. The type M1 instructions can only be executed on the "M1" execution unit 59. The type EX instructions can be executed on either the "E0" or the "E1" execution units 56, 58. The type MX instructions can be executed on either the "M0 or the M1" execution units 57, 59. Some embodiments of the processor 51 can also execute type IM instructions on any of the four execution units 56, 58, 57, 59. The processor 51 fixes priorities for assigning instructions to dispatch waves based on the above-mentioned instruction types as set forth below.

Still referring to FIG. 9, the processor 51 is a specific embodiment of the processor 50 of FIG. 3. The scheduler 54 includes the instruction buffer 62 and four assignment registers 80, 82, 81, 83. The entries of the "E0", "E1", "M0", and "M1" assignment registers 80, 82, 81, 83 correspond to entries of the instruction buffer 62 holding ready instructions that are assigned to be dispatched to the "E0", the "E1", the "M0", and the "M1" execution units 56, 58, 57, 59, respectively.

Still referring to FIG. 9, the scheduler 54 prioritizes the assignment of instructions in each dispatched wave of instructions. The assignment of the type E0 and E1 instructions to the "E0" and "E1" assignment registers 80, 82, respectively, has a higher priority than the assignment of the type EX or IM instructions to these assignment registers 80, 82. Similarly, the assignment of the type M0 and M1 instructions to the "M0" and "M1" assignment registers 81, 83, respectively, has a higher priority than the assignment of type MX and IM instructions to these assignment registers 81, 83. In one embodiment, the scheduler first searches the positions 64, 66, 68, 70, 71 of the instruction buffer 62 for ready type E0, E1, M0, and M1 instructions to assign to the respective "E0", "E1", "M0", and "M1" assignment registers 80, 82, 81, 83. Then, the scheduler 54 searches for ready type EX, MX, and IM instructions to assign in response to not finding enough ready type E0, E1, M0, and M1 instructions to assign to the respective "E0", "E1", "M0", and "M1" assignment registers 80, 82, 81, 83. This reduces the loss of execution opportunities that could occur if type EX, MX, or IM instructions were first assigned for dispatch to the execution units 56, 58, 57, 59 and then one of type E0, E1, M0, and M1 instructions were assigned to the remaining execution units 56, 58, 57, 59.

Still referring to FIG. 9, various alternative embodiments of the scheduler 54 treat type IM instructions differently. One embodiment assigns type IM instructions either the type EX or the type MX in the instruction buffer 62. In a first specific embodiment, the scheduler 54 alternates classifying received type IM instructions to the types EX and MX. In a second specific embodiment, the scheduler 54 searches the instruction buffer 62 for ready type IM instructions in response to not finding enough ready type E0, E1, EX, M0, M1, and MX instructions to assign to all of the available execution units 56, 58, 57, 59. Then, the type IM instructions have a lower assignment priority than the type E0, E1, EX, M0, M1, and MX instructions.

The schedulers 54 of the above-described embodiments may be used in different parts of the processors 49, 50, 51 of FIGS. 3, 4 and 9, respectively. In one embodiment, the scheduler 54 assigns "macro" instructions retrieved by the fetcher 52 to parallel decoders. In this embodiment, the execution units 56, 58, 57, 59 are individual decoders that translate received instructions into hardware executable instructions. In this embodiment, the decoders execute the "macro" instructions by producing executable instructions. The wave assignment of instructions to the "decoders" 56, 57, 58, 59 can enhance the speed of supplying instructions to the processors 50, 51 of FIGS. 3 and 7. In another embodiment, the execution units 56, 57, 58, 59 operate on data. Then, the speed of performing "executable" instructions can be increased by the wave dispatch of instructions for execution. The scheduler 54 may enable more efficient dispatch of instructions to the available execution units 56, 58, 57, 59 in any hardware device that can receive instructions in waves, i.e. during one clock cycle.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus comprising:
    a first execution unit to execute a first type and a second type of instructions;
    a second execution unit to execute the second type of instruction, but not the first type of instruction; and
    a scheduler coupled to said two execution units to dispatch the instructions in a wave, said scheduler dispatching the first type of instruction to the first execution unit with a higher priority than the second type of instruction in each dispatch wave.

2. The apparatus of claim 1, wherein said scheduler schedules the second type of instruction for dispatch to said first execution unit when the first type of instruction is not present for dispatch.

3. The apparatus of claim 1, wherein said scheduler includes an instruction buffer, in which instructions for dispatch are stored in the buffer.

4. The apparatus of claim 3, wherein said scheduler includes first and second assignment registers, said first and second assignment registers to identify dispatch of prioritized instructions to said first and second execution units, respectively.

5. A method of dispatching instructions in a processor comprising:
    dispatching either a first type of instruction or a second type of instruction to a first execution unit from a scheduler, but placing a higher priority for dispatch of the first type of instruction over the second type of instruction; and
    dispatching one of the second type instruction to a second execution unit from the scheduler in a wave with the dispatch to the first execution unit, the second execution unit executing second type of instructions, but not the first type.

6. The method of claim 5, wherein said dispatching the first type of instruction with a higher priority to the first execution unit includes scheduling the second type of instruction for dispatch to the first execution unit when the first type of instruction is not present for dispatch.

7. The method of claim 5 in which the dispatching to the second execution unit includes dispatching either the second type of instruction or a third type of instruction to the second execution unit, in which the third type of instruction is given higher priority for dispatch from the scheduler to the second execution unit.

8. The method of claim 5 further including the searching for instructions stored in an instruction buffer that are ready for dispatch and prioritizing the ready instructions for dispatch.

9. An apparatus comprising:
    an instruction scheduler;
    a first execution unit coupled to said instruction scheduler and to execute first and second type instructions, said instruction scheduler scheduling the first type instruction for dispatch to said first execution unit with a higher priority than the second type instruction; and
    a second execution unit coupled to said instruction scheduler and to execute the second type instruction, but not the first type instruction, said instruction scheduler dispatching instructions to said first and second execution units in a wave.

10. The apparatus of claim 9, wherein said instruction scheduler schedules the second type instruction for execution by said first execution unit when the first type instruction is not present for execution by said first execution unit.

11. The apparatus of claim 9, wherein said instruction scheduler includes an instruction buffer in which instructions for dispatch to said execution units are stored.

12. The apparatus of claim 11, wherein said instruction scheduler schedules the second type instruction for execution by said first execution unit when the first type instruction is not present.

13. The apparatus of claim 9, wherein said scheduler includes first and second assignment registers, said first and second assignment registers having bits to identify which instructions are to be dispatched to said first and second execution units, respectively.

14. The apparatus of claim 13, wherein said first and second assignment registers includes bits corresponding to instructions stored in said buffer and in which a value of each bit determines if a particular instruction is to be dispatched to said execution units.

15. The apparatus of claim 10, wherein said first assignment register is coupled to said first execution unit to select one of first or second type instruction stored in said buffer to dispatch to said first execution unit and said second assignment register coupled to said second execution unit to select one of the second type instruction stored in said buffer to dispatch to said second execution unit.

16. The apparatus of claim 10, wherein the instructions are macro-instructions.

17. The apparatus of claim 9, wherein said second execution unit executes a third type instruction, in which the third type instruction has higher priority of dispatch from said instruction scheduler to said second execution unit than the second type instruction.

18. The apparatus of claim 17, wherein said instruction scheduler schedules the second type instruction for dispatch to the second execution unit when the third type instruction is not present.

19. The apparatus of claim 9, further comprising:
a third execution unit coupled to said instruction scheduler and to execute third or fourth type instructions, said instruction scheduler scheduling the third type instruction for dispatch to said third execution unit with a higher priority than the fourth type instruction; and
a fourth execution unit coupled to said instruction scheduler, and to execute the fourth type instruction, but not the third type instruction.

20. The apparatus of claim 19, wherein said instruction scheduler schedules the fourth type instruction for dispatch to the third execution unit when the third type instruction is not present for execution by said third execution unit.

21. The apparatus of claim 19, wherein a fifth type instruction is executable by said first, second, third, and fourth execution units.

22. The apparatus of claim 9, wherein a type of an instruction determines which execution unit or units can execute the instruction.

23. A method of dispatching instructions in a wave, comprising:
assigning a first type instruction for dispatch to a first execution unit, if the first type instruction is available for dispatch, otherwise assigning a second type instruction for dispatch;
assigning a third type instruction for dispatch to a second execution unit, if the third type instruction is available for dispatch, otherwise assigning the same or different second type instruction for dispatch; and
dispatching the assigned instructions for execution to the first and second execution units in a wave.

24. The method of claim 23, wherein the assigning of instructions for dispatch includes searching for a ready instruction of a specific type in an instruction buffer.

25. The method of claim 24, wherein the assigning instructions for dispatch includes setting bit values in a register corresponding to buffer locations having instructions which are to be dispatched to corresponding execution units.

26. The method of claim 23, wherein:
the assigning of the first type instruction or the second type instruction for dispatch to the first execution unit includes storing a first logic signal in a first assignment register, the first logic signal corresponding to a position in the instruction buffer of the instruction being dispatched to the first execution unit; and
the assigning of the third or the same or different second type instruction for dispatch to the second execution unit includes storing a second logic signal in a second assignment register, the second logic signal corresponding to a position in the instruction buffer of the instruction being dispatched to the second execution unit.

* * * * *